Patented Dec. 5, 1922.

1,437,553

UNITED STATES PATENT OFFICE.

DAVID C. REED, OF FLUSHING, NEW YORK, ASSIGNOR TO NATIONAL CARBON COMPANY, INC., A CORPORATION OF NEW YORK.

ELECTRIC BATTERY.

No Drawing. Application filed May 9, 1919. Serial No. 295,982.

*To all whom it may concern:*

Be it known that I, DAVID C. REED, a citizen of the United States, residing at No. 61 Franconia Avenue, Flushing, in the county of Queens and State of New York, have invented a certain new and useful Improvement in Electric Batteries, of which the following is a full, clear, and exact description.

This invention relates to electric batteries and especially to the type of battery in which the electrolyte solution is kept away from the zinc until the cell is to be made active. The materials used in these, and the structure, are usually very similar to those of the ordinary dry cell in which a zinc container electrode lined with a wet bibulous paper is filled with a mix of carbon and pyrolusite moistened with an electrolyte solution containing zinc chloride and ammonium chloride and having a central carbon electrode and a seal. The type of cell to which the improvements of the present invention especially relate contains a dry cell mix of carbon, pyrolusite and electrolyte, and a hollow carbon electrode, or an opening in the seal, through which water is added to make the cell active.

These cells will be unaffected by long periods on shelf and readily become active on the addition of water. While in reserve cells there is very little deterioration due to local action on the zinc and other causes affecting the ordinary dry cell on shelf, it has been found that after long periods on shelf the cells do not reach the full amperage as quickly as fresh cells and often never reach satisfactory amperage.

The object of the present invention is to produce a cell of the type referred to, which, regardless of age, will rapidly absorb water and reach its full amperage soon after the water is added.

It has been found that the failure to reach full amperage, above referred to, is due chiefly to the action of the dry zinc chloride on the bibulous paper lining. This action, which is a sort of parchmentization, renders the paper harder and reduces its absorptive capacity. The zinc chloride of the electrolyte is very hygroscopic and it may affect the paper by absorbing the water therein, or it may form a concentrated solution on the surface of the paper. Again, it may even chemically react with the paper.

However, regardless of the theory of the action, it has been proven to have deleterious effects on the lining.

I have found that the deleterious action of the electrolyte can be eliminated without affecting the action of the cell, by using therein a dry, non-hygroscopic electrolyte of zinc chloride and ammonium chloride. A method which results in forming an electrolyte of the desired properties consists in adding a small amount of water to a mixture of zinc chloride and ammonium chloride in the proportions used in the battery electrolyte, viz about 9 parts by weight of $ZnCl_2$, 25 parts by weight of $NH_4Cl$, and about 2 parts of water, and drying. However, various amounts of water may be used without affecting the result. Upon the addition of the water the mass swells and the fine particles appear to combine forming larger crystalline particles.

Another method consists in dissolving the zinc chloride and ammonium chloride and evaporating the solution to substantial dryness. From a study of the chemical literature it appears that a chemical combination of the zinc chloride and ammonium chloride would occur, resulting probably in the formation of the compound $ZnCl_2 \cdot 2NH_4Cl$ or $ZnCl_2 \cdot 3NH_4Cl$, the reaction with the above proportions of materials probably being as follows:—

$$6NH_4Cl + ZnCl_2 = 3NH_4Cl + 3NH_4Cl \cdot ZnCl_2.$$

However, I do not wish to be understood as limited to the previous explanation, and another possibility is the formation of a non-hygroscopic hydrated zinc chloride, thus:—

$$mNH_4Cl + nZnCl_2 + xH_2O = mNH_4Cl + nZnCl_2 \cdot xH_2O.$$

There also may be a mixture of this latter with the zinc ammonium chloride compound previously referred to, in accordance with the following:—

$$mNH_4Cl + nZnCl_2 + xH_2O = wZnCl_2 \cdot yNH_4Cl + zZnCl_2 \cdot xH_2O.$$

In the foregoing equations the compounds on the right hand side are intended to represent the electrolyte to be used in the cell.

In order to secure the desired result it is not necessary to remove all the water. The water remaining apparently may be either combined or uncombined, but the electrolyte salts should be in a substantially dry condition.

Having described my invention, what I claim is:—

1. Process of rendering zinc chloride non-injurious to paper or the like stored in proximity thereto, which comprises treating the zinc chloride with ammonium chloride in the presence of water and then evaporating enough water to leave a substantially dry residue.

2. Process of rendering zinc chloride non-injurious to paper or the like stored in proximity thereto, which comprises treating the zinc chloride with more than three molecules of $NH_4Cl$ per molecule of $ZnCl_2$ in the presence of water, and then removing enough water to leave a substantially dry residue.

3. Process of rendering zinc chloride non-injurious to paper or the like stored in proximity thereto, which comprises treating the zinc chloride with more than three molecules of $NH_4Cl$ per molecule of $ZnCl_2$ in the presence of water, and forming a substantially dry material from the zinc chloride and ammonium chloride.

4. Process of assembling a package adapted to form an active electric battery upon the addition of an electrolyte solvent, which comprises surrounding a carbon electrode with a separating member of paper or the like, and filling the space between said carbon electrode and said separating member with a depolarizing mix containing substantially dry zinc chloride associated with ammonium chloride in a form non-injurious to said separating member.

5. Process of assembling a package adapted to form an active electric battery upon the addition of an electrolyte solvent, which comprises surrounding a carbon electrode with a separating member of paper or the like, and filling the space between said carbon electrode and said separating member with a depolarizing mix containing substantially dry zinc chloride in combination with ammonium chloride, said combination being non-injurious to said separating member.

6. Process of preparing an electric cell, which comprises forming a substantially dry composition of zinc chlorid and ammonium chlorid, surrounding a carbon electrode with a separating member of paper or the like, and filling the space between said electrode and separating member with said composition.

7. A package adapted to form an active electric battery upon the addition of an electrolyte solvent, said package containing a separating member of paper or the like, and in proximity thereto substantially dry zinc chloride associated with ammonium chloride in a form which is non-injurious to said separating member.

8. A package adapted to form an active electric battery upon the addition of an electrolyte solvent, said package containing a separating member of paper or the like, and in proximity thereto substantially dry zinc chloride associated with ammonium chloride in a combination which is non-injurious to said separating member.

9. A package adapted to form an active electric battery upon the addition of an electrolyte solvent, said package containing a separating member of paper or the like, and in proximity thereto substantially dry zinc chloride in a combination with ammonium chloride, said combination being non-injurious to said separating member.

10. A package adapted to form an active electric battery upon the addition of an electrolyte solvent, said package containing a separating member of paper or the like, and in proximity thereto a substantially dry composition containing zinc chlorid and ammonium chlorid in which there are not less than three molecules of ammonium chlorid to each molecule of zinc chlorid, said composition being non-injurious to said separating member.

In testimony whereof, I hereunto affix my signature.

DAVID C. REED.